US008219112B1

(12) United States Patent  
Youssef et al.

(10) Patent No.: US 8,219,112 B1  
(45) Date of Patent: Jul. 10, 2012

(54) ACCURACY ANALYSIS OF WIRELESS BASE STATION LOCATION

(75) Inventors: Adel Amin Youssef, Santa Clara, CA (US); Zhengrong Ji, Sunnyvale, CA (US); Michael Jesse Chu, Los Altos Hills, CA (US); Ravi Jain, Palo Alto, CA (US); Steven John Lee, San Francisco, CA (US)

(73) Assignee: Google Inc., Mountain View, CA (US)

( * ) Notice: Subject to any disclaimer, the term of this patent is extended or adjusted under 35 U.S.C. 154(b) by 688 days.

(21) Appl. No.: 12/324,486

(22) Filed: Nov. 26, 2008

Related U.S. Application Data

(60) Provisional application No. 60/990,488, filed on Nov. 27, 2007, provisional application No. 60/990,569, filed on Nov. 27, 2007, provisional application No. 61/196,167, filed on Oct. 15, 2008.

(51) Int. Cl.
*H04W 24/00* (2009.01)
*G01S 19/00* (2010.01)

(52) U.S. Cl. ............... 455/456.1; 455/456.2; 455/456.6; 455/457; 342/357.2

(58) Field of Classification Search ................ 455/456.1
See application file for complete search history.

(56) References Cited

U.S. PATENT DOCUMENTS

| | | | | |
|---|---|---|---|---|
| 6,445,927 | B1 * | 9/2002 | King et al. | 455/456.6 |
| 2003/0125046 | A1 * | 7/2003 | Riley et al. | 455/456 |
| 2003/0224804 | A1 * | 12/2003 | Liu | 455/456.1 |
| 2006/0211431 | A1 * | 9/2006 | Mansour et al. | 455/456.2 |

OTHER PUBLICATIONS

Barnes, R., "Variogram Tutorial", *Golden Software, Inc.*, downloaded from: http://www.goldensoftware.com/variogramTutorial.pdf on Nov. 26, 2008; 23 Pages.

* cited by examiner

*Primary Examiner* — Dwayne Bost
*Assistant Examiner* — Timothy Pham
(74) *Attorney, Agent, or Firm* — Sterne, Kessler, Goldstein & Fox, P.L.L.C.

(57) ABSTRACT

A method and system for accuracy analysis of wireless base station location is provided. In one embodiment, data from a set of mobile devices using a wireless base station is collected. A location of a wireless base station is estimated based on locations of the mobile devices (i.e. points) in the collected set. To provide a more accurate location estimation for the wireless base station, the estimated location is analyzed for accuracy based on the collected data. A confidence score is calculated using a weight function with weights for the collected data based on factors, such as, collection size, platform types of the mobile devices, quality, temporal diversity and/or spatial diversity of points corresponding to the mobile devices, etc. An estimated location of the wireless base station may be adjusted based on the calculated confidence score. An estimated coverage region of the wireless base station may be also estimated and adjusted.

22 Claims, 9 Drawing Sheets

ACCURACY ANALYSIS OF WIRELESS BASE STATION LOCATION

CROSS REFERENCE TO RELATED APPLICATIONS

The present application claims the benefit of U.S. Provisional Patent Application No. 60/990,488, filed on Nov. 27, 2007, entitled "Accuracy Analysis of Wireless Base Station Location" by Youssef et al., U.S. Provisional Patent Application No. 60/990,569, filed on Nov. 27, 2007, entitled "Locating Electronic Devices Using Passive Radios", and U.S. Provisional Patent Application No. 61/196,167, filed on Oct. 15, 2008, entitled "Wireless Network-Based Location Approximation", which are incorporated herein by reference in their entirety.

FIELD OF THE INVENTION

The present invention relates to accuracy analysis of wireless base station location information.

BACKGROUND ART

Information regarding the locations of various wireless base stations (e.g. cell towers) is usually only available to mobile service providers that use the wireless base stations or other entities responsible for the wireless base stations. Further, even mobile service providers may not have knowledge of the locations of many wireless base stations outside of their own networks.

For at least these reasons, it has been difficult to gather complete information on the locations of various wireless base stations, and even more difficult to obtain accurate information on the locations of various wireless base stations.

BRIEF SUMMARY OF THE INVENTION

The present invention provides systems and methods for analyzing the accuracy of estimated wireless base station location information. In embodiments, an analysis of the accuracy of estimated wireless base station location information is performed. Such estimated wireless base station location information may be made based on data obtained from mobile devices.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawings in which an element first appears is generally indicated by the left-most digit in the corresponding reference number.

DETAILED DESCRIPTION OF EMBODIMENTS OF THE INVENTION

Figure 1A:
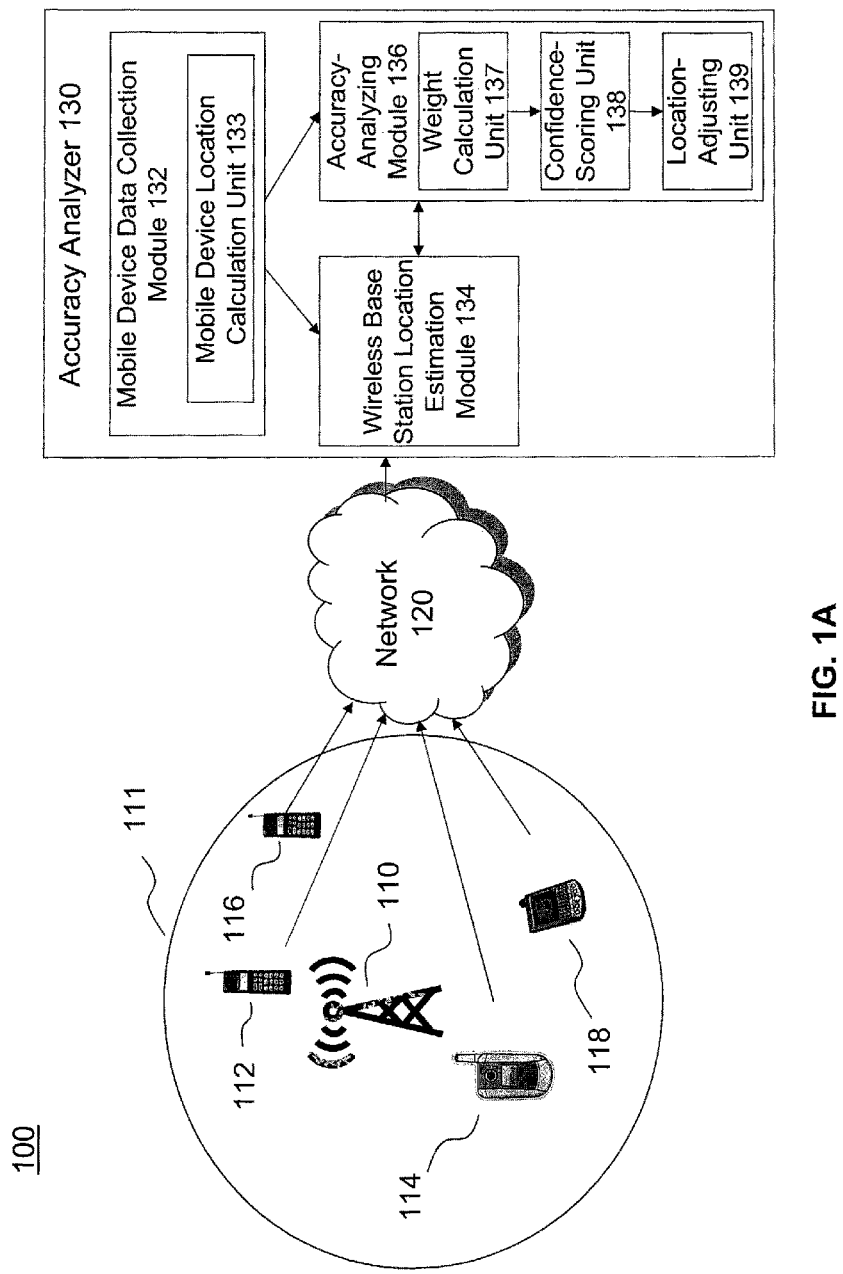
FIG. 1A is an exemplary diagram of a system for the accuracy analysis of wireless base station locations according to one embodiment of the invention.

Embodiments of the present invention include systems and methods for analyzing the accuracy of estimated wireless base station location information. In embodiments, an analysis of the accuracy of estimated wireless base station location information is performed. Such estimated wireless base station location information may be made based on data obtained from mobile devices, and without access to actual wireless base station location information from corresponding mobile service providers. Further analysis of the accuracy of this estimated wireless base station location information may then be carried out.

According to a feature, different heuristics are used to assign a confidence score to each estimated location based on an analysis of the data used to estimate the location.

In the detailed description of the invention herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Heretofore, information on locations of wireless base stations (e.g. cell towers) has usually only been available to mobile service providers or other entities responsible for particular wireless base stations. This actual wireless base station location information can be limited to particular networks using these wireless base stations. Such information is often unavailable to other application providers and general users. Because such information can provide geographic information in many applications, it is desirable to have at least an estimation of the locations of wireless base stations.

Estimated Wireless Base Station Location Information

In one approach, the location (and coverage area) of one or more wireless base stations can be estimated using information provided from various mobile devices. This estimated wireless base station location information can be obtained even without consulting with mobile service providers or other entities having knowledge of actual wireless base station locations. Estimated wireless base station location information may be made based on data obtained from mobile devices even when the data obtained from mobile devices is noisy and biased by certain user(s) or usage patterns.

A mobile device needs to use a nearby wireless base station to transmit data. This wireless base station may be (but does not have to be) the closest wireless base station available to the mobile device. The identification of the wireless base station can be detected from the data transmitted to or from the mobile device and the wireless base station. Based on the transmitted data (such as signal headers and application specific data), the locations (i.e., points) of the mobile devices using wireless based stations can be estimated. For example, a mobile device may be GPS-enabled. In this situation, the transmitted data may include GPS location information, e.g. GPS coordinates of a mobile device. The GPS coordinates may include a latitude value and a longitude value, e.g. (37.730126, −122.403014). The transmitted data may also include information about a map currently displayed on the mobile device. The information may include coordinates of the center of the map. In one embodiment, the coordinates may be in a (latitude, longitude) format. The transmitted data may include platform information about a mobile device. The platform may be SYMBIAN, WINDOWS MOBILE, IPHONE, or ANDROID, etc. The transmitted data may also include model information about the mobile device. For example, the mobile device model may be NOKIA, SONY, LG, IPHONE, GPHONE, or BLACKBERRY, etc. The transmitted data may include a radio type of the mobile device, such as GSM, CDMA, or WCDMA (UMTS), etc. The transmitted data may also include information about the service provider, such as AT&T, T-Mobile, Verizon, or Sprint PCS, etc. Other information and application specific data may also be included in the transmitted data.

After collecting a set of points from one or more mobile devices using the same wireless base station, the location of the station can then be estimated. For example, in one embodiment, this estimated wireless base station location can be a centroid (mean location) of the points associated with the same wireless base station. These points can correspond to locations of the same or different multiple mobile devices using the wireless base station at the same or different times. In another embodiment, a weighted centroid of the points is calculated based on a weighted average of the points. Different points can have different weights. For example, points obtained based on the GPS coordinates may have higher weights than points obtained based on the center of the displayed map. A coverage region of the wireless base station can also be estimated so that all the points in a collection are covered. The coverage region can also be set to cover a portion (e.g. 90%) of the points in the collection. Alternatively, in one embodiment as described in U.S. provisional application No. 61/196,167, filed on Oct. 15, 2008 (incorporated in its entirety herein by reference), a set of coverage regions can be estimated based on the confidence score. The coverage regions can have different sizes and different confidence scores.

Accuracy Analysis

According to a feature, an accuracy analysis of estimated wireless base station location information can be performed. This may be helpful, for example, in cases where points obtained from mobile devices may not be entirely accurate. Such points in turn may cause the estimated location or coverage region of the wireless base station to be inaccurate.

In an embodiment, data from a set of mobile devices using a common wireless base station is collected. Locations of the mobile devices (i.e. points) are calculated based on the collected data. In another embodiment, information about locations of the mobile devices is obtained from an outside module. A location of the wireless base station is estimated based on the points corresponding to the mobile devices. To provide more accurate location information for the wireless base station, the estimated location is analyzed based on the collected data. A confidence score is calculated using a weight function. The weights used by the weight function are obtained based on information from the collected data such as size of the collection (e.g. the cardinality or number of points in the collection), quality of the points, platform information regarding the mobile devices, temporal diversity and spatial diversity of the points corresponding to the mobile devices, etc. The quality of the points may depend on how the points are obtained. For example, a point obtained using GPS coordinates may have a better quality than a point estimated by the center of a map. The estimated location of the wireless base station is then adjusted based on the calculated confidence score. An estimated coverage region of the wireless base station may be also estimated and adjusted.

Several factors can be taken into account in order to provide more accurate estimations regarding wireless base station locations and coverage regions. The factors may include the number of points, quality of the points (e.g., indicated by GPS data, or by the center of the map), platform information regarding corresponding mobile devices, temporal diversity of the points, spatial diversity of the points, etc. For example, the estimated location of a wireless base station will be more accurate when more points are used. More variety of platforms of mobile devices indicates more users for the wireless base station, and increase the accuracy of the estimation. With regard to temporal diversity, points spanning multiple distinct times may contribute to a more accurate estimation than points spanning fewer distinct times. Also, with regard to spatial diversity, more accurate estimation can be achieved by using points spread in a larger space than points clustered in a smaller area. A weight function can be used to calculate a confidence score based on above information. Accordingly, the estimated location and coverage region for the wireless base station can be adjusted based on the confidence score. Further details about calculating weights and confidence scores and adjusting estimated location and coverage radius will be described later. In another embodiment, a Monte Carlo-type analysis may also be performed.

FIG. 1A illustrates an exemplary system 100 of accuracy analysis of wireless base station location according one embodiment of the invention. In FIG. 1A, a wireless base station 110 has a coverage region 111. In coverage region 111, mobile devices 112, 114, 116, and 118 use wireless base station 110 to send and receive data. A portion of the data is collected by an accuracy analyzer 130 through network 120. The locations of mobile devices 112, 114, 116, and 118 (i.e. points) are estimated based on the collected data. The location of wireless base station 110 is then estimated based on these points. A coverage region of wireless base station 110 can also be estimated. Accuracy analyzer 130 evaluates the accuracy of the estimated location of wireless base station 110. Accuracy analyzer 130 also adjusts the estimated location of wireless base station 110 and the size of coverage region 111 based on the analysis result.

Figure 2:
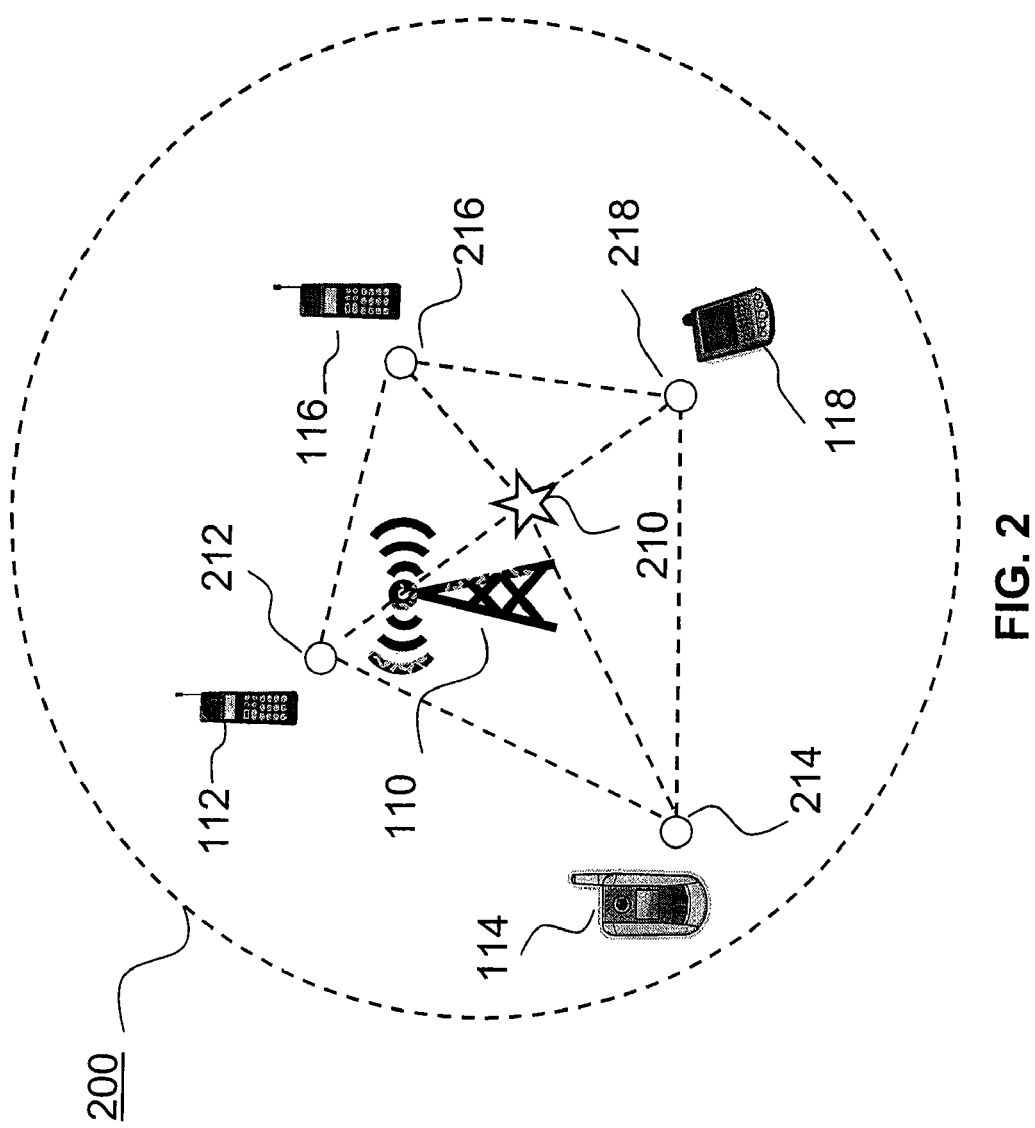
FIG. 2 is an exemplary diagram of estimating the location of a wireless base station based on locations of a set of mobile devices according to one embodiment of the invention.
Figure 3:
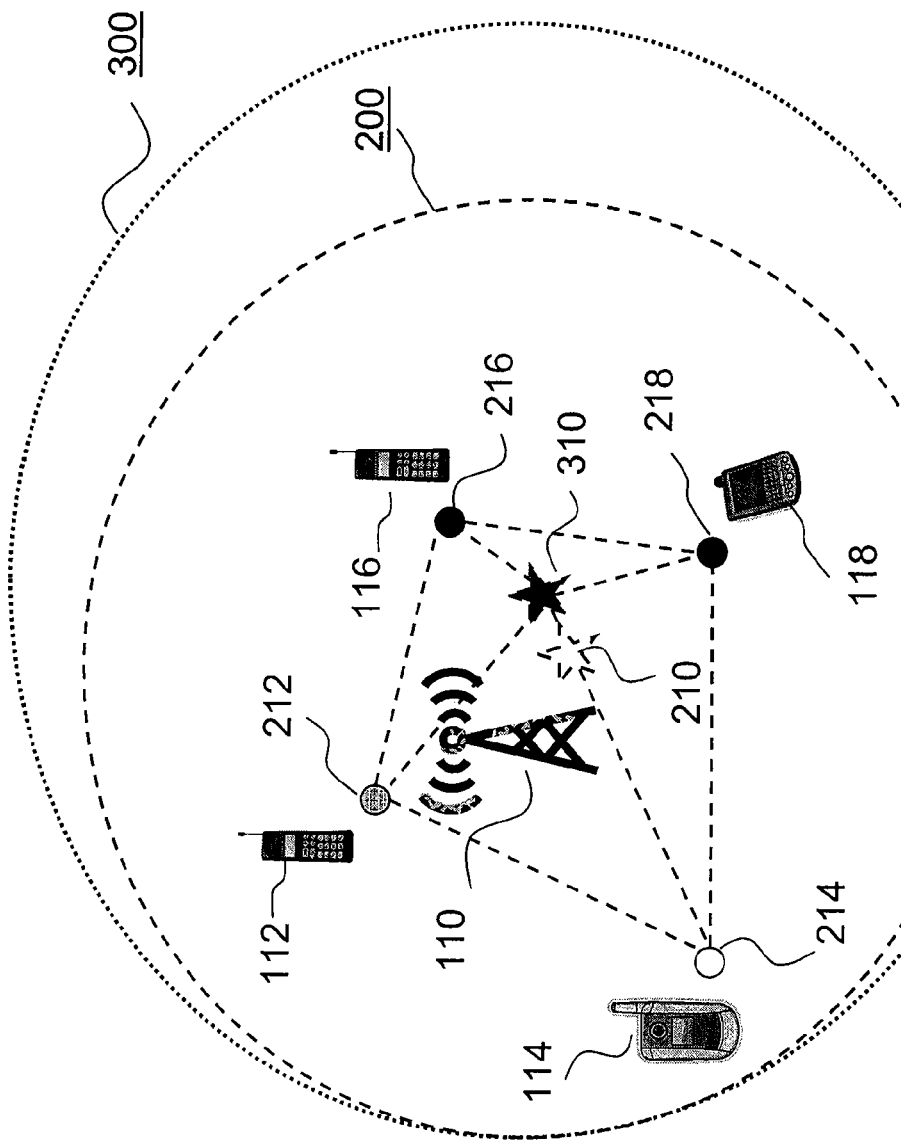
FIG. 3 is an exemplary diagram of adjusting the estimated location of the wireless base station based on one or more weights of the set of mobile devices according to one embodiment of the invention.

Accuracy analyzer 130 includes a mobile device data collection module 132, a wireless base station location estimation module 134, and an accuracy-analyzing module 136. Mobile device data collection module 132 collects communication data or other data on mobile devices (e.g. mobile device 112) covered by a wireless base station (e.g. wireless base station 110). Mobile device data collection module 132 includes a mobile device location calculation unit 133 to calculate points based on collected data corresponding to the mobile devices. Wireless base station location estimation module 134 estimates the location of the wireless base station based on the points calculated by mobile device location calculation unit 133. Wireless base station location estimation module 134 can also estimate the coverage region of the wireless base station. FIG. 2 shows an example of estimating wireless base station location and coverage region and is described in greater detail below. Accuracy-analyzing module 136 analyzes the accuracy of the location of the wireless base station estimated by wireless base station location estimation module 134 and adjusts the estimated location based on the analysis results. FIG. 3 shows an example of adjusting the estimated location and coverage region for the wireless base station and is described in greater detail below.

Accuracy analyzer 130, including each of its components (a mobile device data collection module 132, a wireless base station location estimation module 134, and an accuracy-analyzing module 136), may be implemented in software, firmware, hardware or any combination thereof. Accuracy analyzer 130, including each of its components (a mobile device data collection module 132, a wireless base station location estimation module 134, and an accuracy-analyzing module 136), may be implemented on a single processing device or across multiple processing devices located at the same or different locations. A processing device can be any type of device having one or more processors including, but not limited to, a computer, computer cluster, set-top box, or mobile computing device (phone or personal data assistant).

Accuracy-analyzing module 136 includes a weight calculation unit 137, a confidence-scoring unit 138, and a location-adjusting unit 139. Weight calculation unit 137 calculates weights of the locations of the mobile devices based on the data collected by mobile device data collection module 132. Confidence-scoring unit 138 calculates a confidence score for the estimated wireless base station location based on the weights calculated by weight calculation unit 137. Location-adjusting unit 139 adjusts the estimated location of the wireless base station based on the confidence score calculated by confidence-scoring unit 138. In this way, the accuracy of the estimated wireless base station location information may be assessed and improved.

Figure 1B:
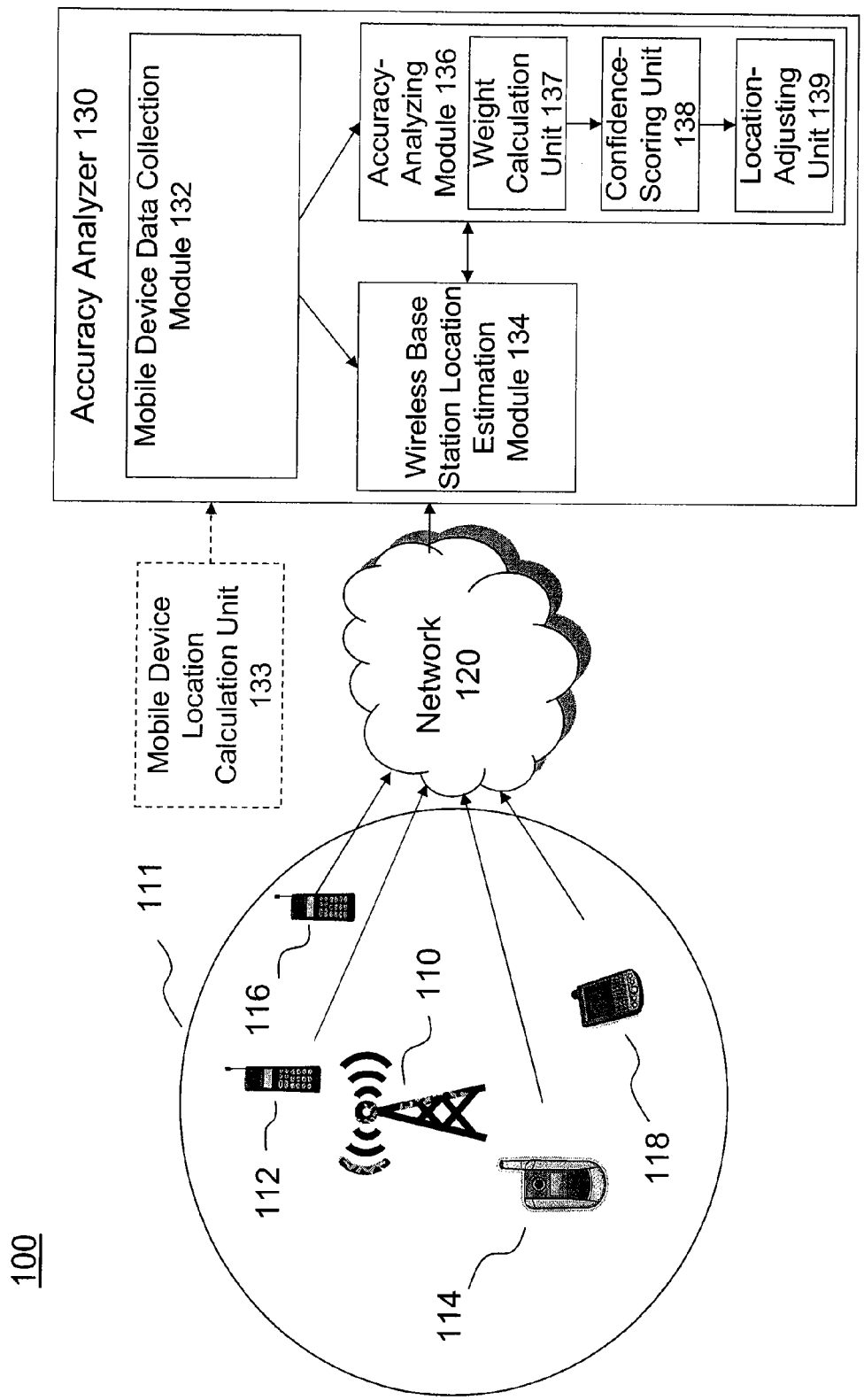
FIG. 1B is an exemplary diagram of another system for the accuracy analysis of wireless base station locations according to one embodiment of the invention.

In an alternative embodiment, mobile device location calculation unit 133 is not included in mobile device data collection module 132 (as shown in FIG. 1B). Accuracy analyzer 130 can obtain mobile device locations from an external or remote mobile device location calculation unit 133. Alternatively, system 100 does not include mobile device location calculation unit 133. For instance, in some examples, the collected data may include mobile device location information, and mobile device data collection module 132 can then determine mobile device locations directly from the collected data.

Figure 4A:
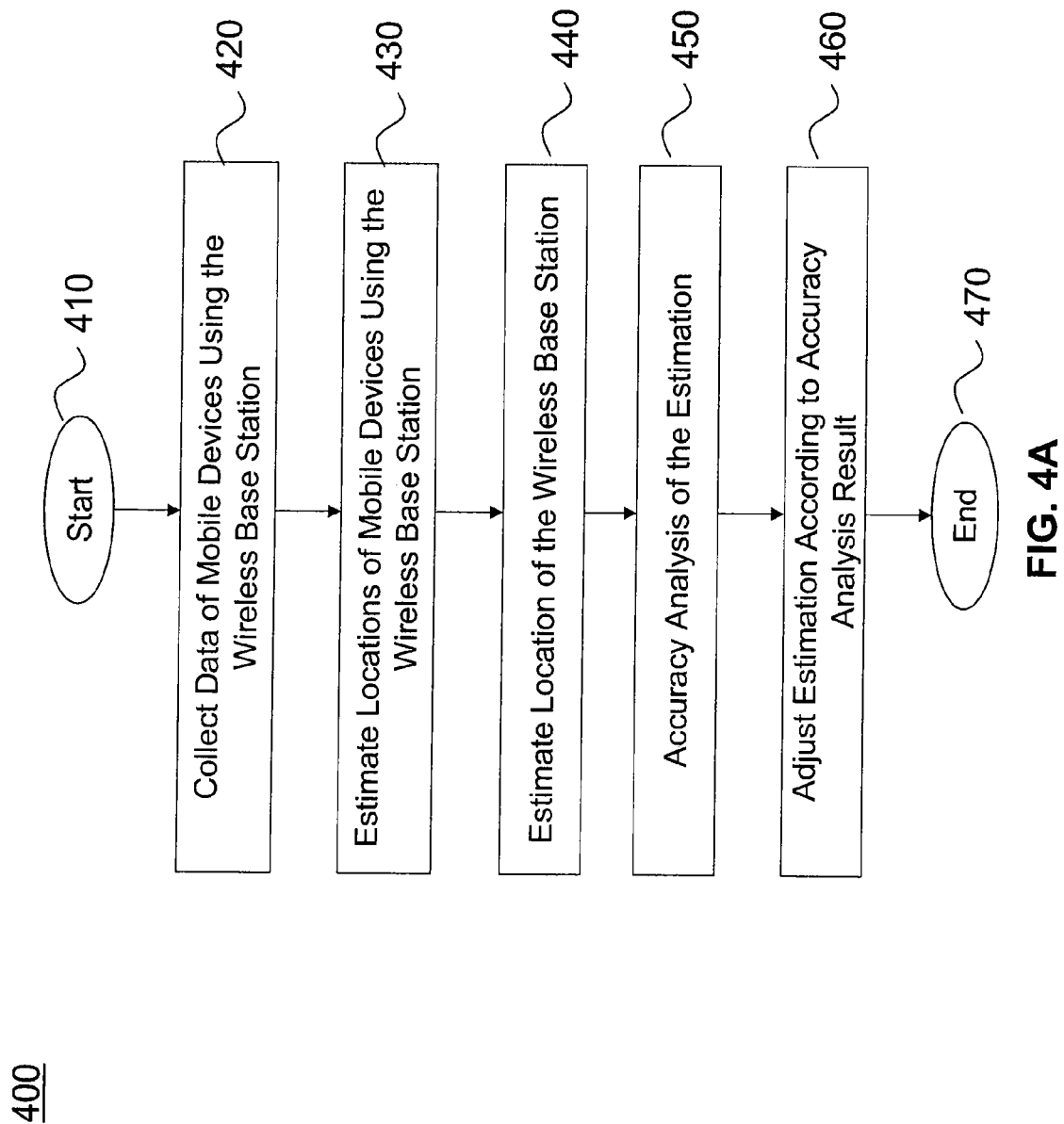
FIG. 4A is a flowchart of an exemplary procedure of the accuracy analysis of wireless base station locations according to one embodiment of the invention.

FIG. 4A illustrates a flowchart of an exemplary method or procedure 400 of an accuracy analysis of a wireless base station location estimation according to one embodiment of the invention (steps 410-470). Although procedure 400 will be described for brevity with reference to system 100 and examples shown in FIGS. 2 and 3, procedure 400 can be used in other systems for the accuracy analysis of estimated wireless base station locations.

In FIG. 4A, procedure 400 starts from step 410 to analyze an estimated location of wireless base station 110. In step 420, data is collected on mobile devices that use one or more wireless base stations. For example, mobile device data collection module 132 may collect data on a set of mobile devices (e.g. mobile devices 112, 114, 116, and 118) which are using wireless base station 110. The data may include platform information regarding the mobile devices, GPS location information if the mobile device is GPS-enabled, time information, application specific data, such as, map requests, etc. In step 430, locations (also called points) of the mobile devices are estimated using the collected data. Mobile device data collection module 132 may use mobile device location calculation unit 133 to calculate the points according to the collected data. For example, in one embodiment, a point corresponding to a GPS-enabled mobile device can be determined by GPS data collected from that mobile device. Sometimes a mobile device user may request a map of his/her current location using the mobile device. In that case, the corresponding point can be determined accordingly as the center of the map. Other techniques for associating a mobile device with a possible location can also be used to calculate points in alternative embodiments.

Figure 4B:
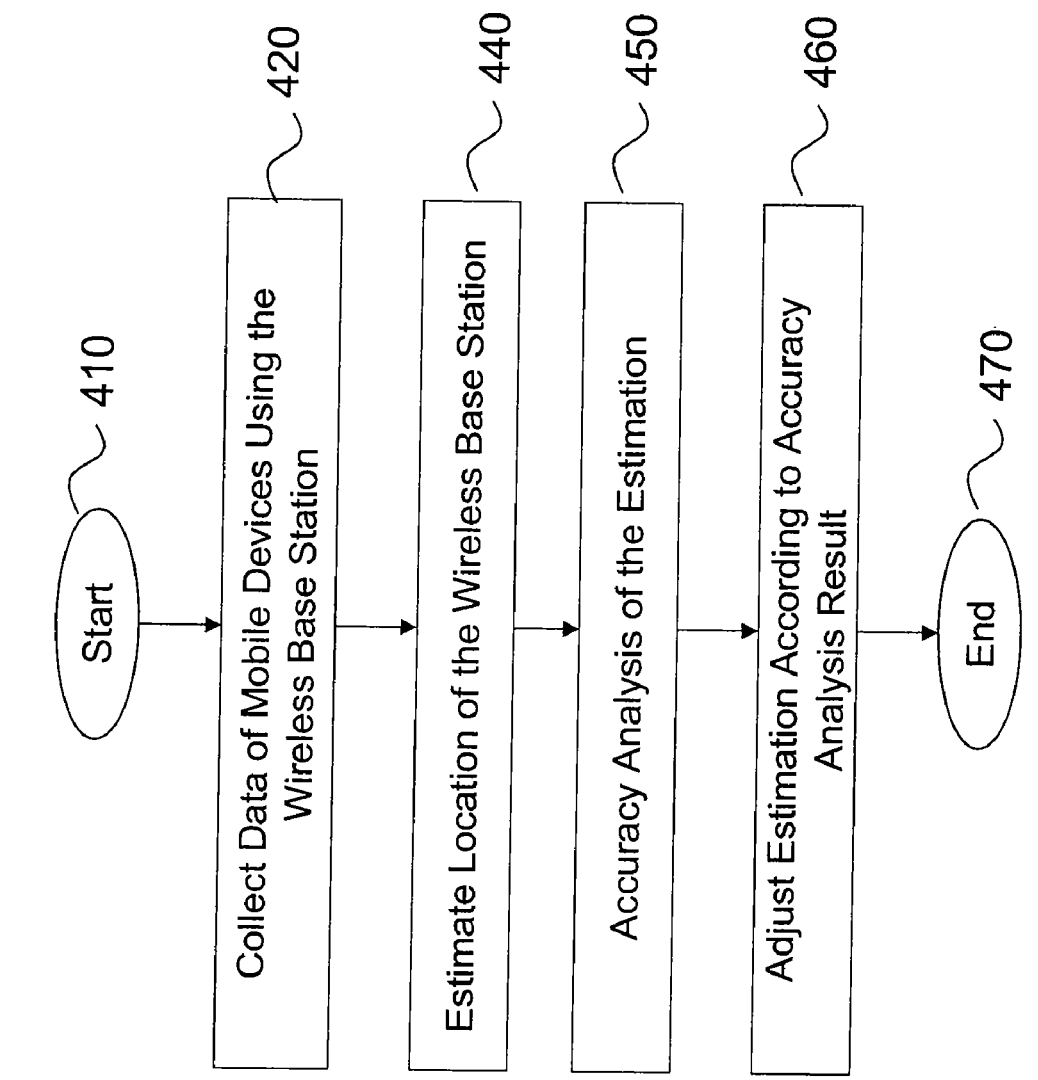
FIG. 4B is a flowchart of another exemplary procedure of the accuracy analysis of wireless base station locations according to one embodiment of the invention.

In another embodiment, locations of the mobile devices covered by the wireless base station are included in the collected data. Therefore, procedure 400 does not calculate the locations of the mobile devices, as shown in FIG. 4B. In one embodiment, procedure 400 can determine the locations of the mobile devices based on the collected data. In yet another embodiment, procedure 400 can obtain the mobile device locations from a mobile device location calculation unit not included in accuracy analyzer 130.

Once the points corresponding to the mobile devices using wireless base station 110 are determined, in step 440, an estimated wireless base station location associated with the points is determined. For example, wireless base station location estimation module 134 may estimate the location of wireless base station 110 based on these points. In one embodiment, a centroid (gravity center) of the points is used as the estimated location for wireless base station 110. In alternative embodiments, other wireless base station location estimation techniques such as a weighted centroid can be applied.

In an embodiment, a coverage region of wireless base station 110 is also estimated to cover the mobile devices in the collection. In one example, this coverage region can be estimated to cover at least the set of points. This can include but is not limited to a region sized to include all the points and have the estimated wireless base station location at or near its center. For example, the coverage region can be a circle centered at the estimated wireless base station. In one embodiment, the radius of the circle is set to cover all the mobile devices in the collection. In another embodiment, the radius of the circle is set to cover a portion (e.g. 90%) of the entire collection.

FIG. 2 illustrates an example of estimating the location of wireless base station 110 based on the locations of mobile devices 112, 114, 116, and 118. In FIG. 4A, points 212, 214, 216, and 218 are the calculated locations of mobile devices 112, 114, 116, and 118, respectively. Based on points 212, 214, 216, and 218, the location of wireless base station 110 is estimated as 210. Region 200 is the estimated coverage region of wireless base station 110.

Figure 5:
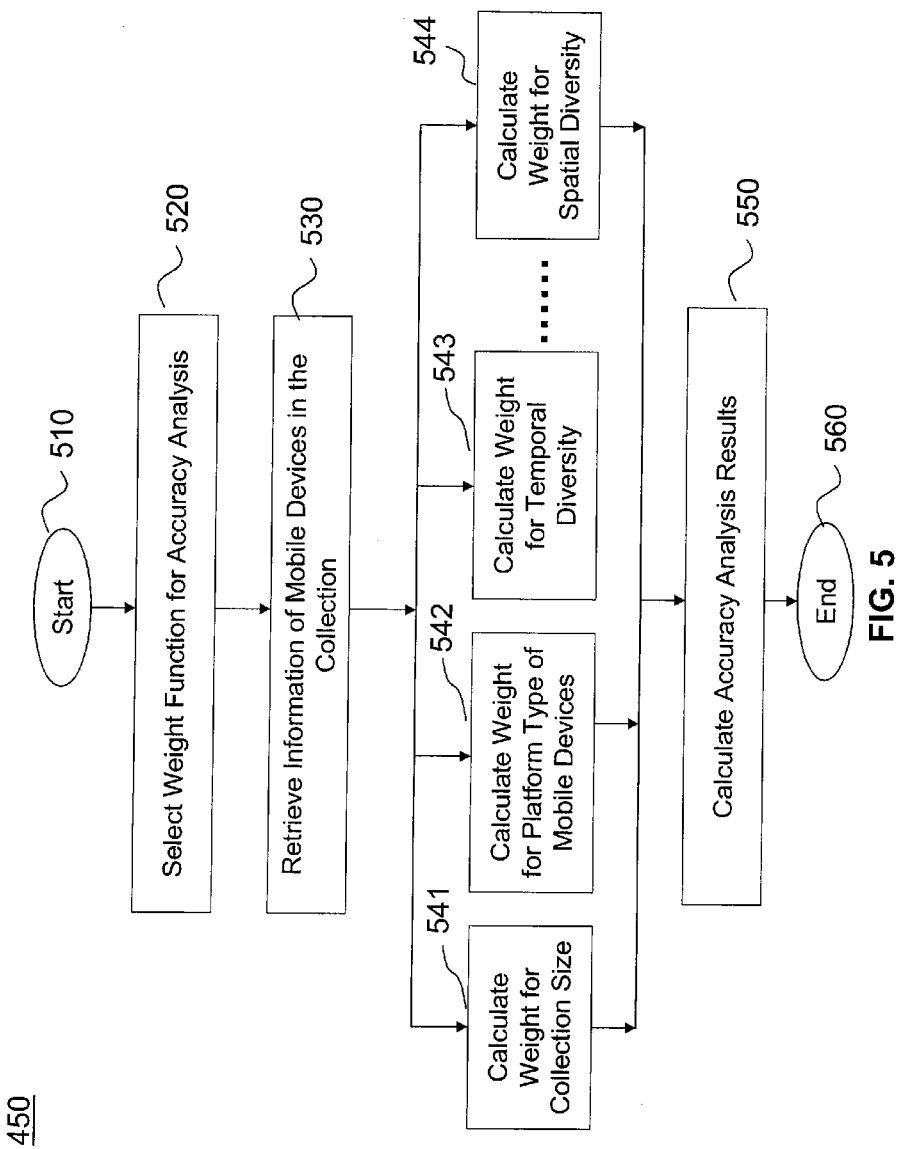
FIG. 5 is a flowchart of an exemplary procedure of analyzing the accuracy of the estimated wireless base station locations using a weight function.

In step 450, the accuracy of the estimated wireless base station location information from step 440 is analyzed. Accuracy-analyzing module 136 analyzes the accuracy of the estimated location of wireless base station 110 based on the data collected by mobile device data collection module 132. The procedure of step 450 is illustrated in further detail in FIG. 5 (steps 510-560) according to an embodiment of the invention.

Procedure 450 starts in step 510 to analyze the accuracy of the estimated location of wireless base station 110 estimated by wireless base station location estimation module 134. In one embodiment, accuracy-analyzing module 136 calculates a confidence score using a weight function. The weights used by the weight function are obtained from the collected data. In step 520, a weight function is selected. The selected weight function can be any function that uses a weighted value of contributing parameters to calculate a final result. Selecting the weigh function depends on many factors including, but not limited to, type of the covered region (e.g., rural, suburban, or urban), number of wireless service providers in the region, etc.

In step 530, accuracy-analyzing module 136 retrieves relevant information for the data collected by mobile device data collection module 132. Various factors may contribute to the accuracy of the estimated wireless base station location, such as the number of points in the collection, the quality of the points (e.g., indicated by GPS data, or by the center of the map), platform information regarding the mobile devices, the temporal diversity and/or the spatial diversity of the points, etc. Weight calculation unit 137 calculates the weights according to these factors based on the retrieved relevant information. One or more calculated weights then may be used to evaluate the accuracy of the estimation (steps 541-544).

First, one weight may be calculated based on the collection size (e.g. the number of points) (step 541). More points in a collection of data points for the wireless base station may reflect a more accurate wireless base station location estimate. Alternatively, less points tend to indicate that the estimation result may be less accurate.

Second, a weight may be calculated based on information about platform types of mobile devices (step 542). A larger diversity of platform types indicates that more users are using the wireless base station. Therefore the estimation result may be more accurate. A higher confidence score can be obtained using such data. A relatively greater weight can be given to these points accordingly. Alternatively, a smaller diversity of platform types may indicate that fewer users are using the wireless base station. Therefore the estimation result may be less accurate (and a relatively lower weight is given to these points).

Third, a weight may be calculated based on the temporal diversity of the points in the collection (step 543). For example, if the data in the collection are collected through more distinct days, the calculated locations (i.e. points) of the corresponding mobile devices may be more accurate. Multiple devices at different locations at different times can result in higher confidence in the estimated result. Consequently, the location of the wireless base station may be more accurately estimated using these points. Alternatively, points spanning less distinct days may indicate less accuracy of the data, which in turn results in a less accurate estimation of the wireless base station location.

In one embodiment, a weight based on temporal diversity is calculated as follows. Let $\sigma$ be the maximum number of time intervals (e.g., hours, days, etc.) that have passed since any new information has been received. In such case, the mean location of the points is the centroid of the points. The temporal weight $W_t$ can be set as $MIN(d, \sigma)/\sigma$, where d is the time interval spanned over the times when the points are collected. In one example, for a set of points, $\sigma$ can be determined by examining the number of time intervals and the change of the location of the centroid. In another example, $\sigma$ can also be selected as the maximum number of time intervals during which the location of the centroid only changes within a predefined distance (e.g. 5 meters). These examples are illustrative and not intended to limit the present invention.

Finally, another weight may be calculated based on the spatial diversity of the points (step 544). For example, when using points scattered in a larger area to estimate the location of a wireless base station, the estimated result tends to be further from each of the points. In such cases, inaccurate points due to noisy data will affect less of the estimation. Therefore the estimated location of the wireless base station will be more accurate. Alternatively, inaccuracy of points clustered in a smaller area may result in a less accurate estimation of the wireless base station location.

In one embodiment, the weight based on spatial diversity can be calculated using quadrat analysis for spatial distribution. For example, the region covering all the points can be divided into a uniform grid. The uniform grid has a set of grid cells. Each grid cell contains a number of points. The number of points in each grid cell is calculated. The average number of points (mean) in a grid cell in the uniform grid can be obtained. A variance of the number of points in a grid cell is computed. The variance compares the number of points in each grid cell with the average number of points in a grid cell. The variance is then compared to the characteristics of a random distribution of the points. For example, a variance-mean ratio is calculated (i.e. variance/mean). If the variance-mean ratio is around 0, the points are uniformly distributed. If the variance-mean ratio is around 1, the points are randomly distributed. If the variance-mean ratio is much larger than 1 (e.g. 9), the points are considered to be in a cluster. A low weight is assigned if the variance-mean ratio is much larger than 1. A larger weight can be assigned if the variance-mean ratio is around 0 or 1.

In another embodiment, a distance threshold is determined to separate two different points. In this way, two points are considered different if they have a distance above the distance threshold. The estimated coverage region of the wireless base station is divided into a uniform grid. The uniform grid has grid cells with length of the distance threshold. An auto correlation between different grid cells can be determined using variograms. A variogram is a function describing the degree of spatial dependence of a spatial field (e.g. the points in the collection). In one example, a variogram is defined as the expected squared increment of the location coordinates between two points. It can be used to determine the auto correlation between grid cells. For example, details about example variograms that can be used may be found in "Variogram Tutorial", by Randal Barnes from Golden Software, Inc. (publication data unknown, available at http://www.goldensoftware.com/variogramTutorial.pdf on Nov. 26, 2008). The weight based on spatial diversity can be assigned accordingly.

These weights relating to estimation accuracy are illustrative and not intended to limit the present invention. Other types of weights and combinations of weights can also be considered as would be apparent to a person skilled in the art given this description. For example, points obtained from GPS coordinates are usually more accurate than points obtained based on non-GPS techniques (e.g. center of the map). Therefore, a weight can be the ratio of points obtained from GPS coordinates to points obtained from non-GPS techniques. Furthermore, the accuracy of the GPS or other location devices may affect the accuracy of the estimation. For instance, a differential GPS receiver on a mobile device may indicate the mobile device's location to within a meter or less, while a non-differential GPS receiver may determine the location to within 5-25 meters or more. In addition, while the accuracy of a GPS receiver outdoors with a clear view of the sky may be close to optimum, performance degradations may occur in urban canyon environments where fewer satellites are "visible" and especially when the GPS receiver is located indoors. In the latter case, the GPS receiver may be unable to fix a location at all. Also the "freshness" of the data collected may be relevant to the confidence score calculation. For example, more recent data may be given a higher weight in the analysis than older data. These examples are illustrative and not intended to limit the present invention.

In one example, a weight represents the likelihood that a particular data point is either valid or an outlier. For instance, this may be expressed as a percentage (e.g. 90% likely that the data point is valid), as a ranking (e.g., a 4 on a scale of 1-5, with 1 being the lowest confidence and 5 being the highest confidence), or some other relative indicator. The weight can be used to discard outliers from the valid points.

In step 550, confidence-scoring unit 138 calculates a confidence score for the estimated location of wireless base station 110 using the weight function selected in step 520 and one or more weights calculated in steps 541-543. Method 450 then proceeds to end at step 560, and control proceeds to step 460.

With an analysis result (e.g. confidence score) obtained in step 450, location-adjusting unit 139 adjusts the estimated location of wireless base station 110 based on the analysis result. In one embodiment, if the confidence score is very low, the coverage region of wireless base station 110 is increased to cover more possible mobile devices and collect more points. The estimated location can then be adjusted based on these more collected points. In another embodiment, the estimated location can be adjusted to a weighted centroid based on the calculated weights.

In alternative embodiments, once the confidence score is calculated, an estimated coverage region of the wireless base station can be adjusted based on the confidence score. For example, in one embodiment, the coverage region is bounded by a circle centered at the estimated location. If the confidence score is above a pre-defined threshold, the radius of the circle is set to cover all points or a portion (e.g. 90%) of the points in the collection. If the confidence score is below the pre-defined threshold, the radius of the circle is set as a pre-defined maximum value based on the type of the region (e.g., rural, suburban, or urban). In another embodiment, the radius of the circle can be calculated by a function of the confidence score and the previously estimated circle radius. Subsequently or at about the same time, the estimated location of the wireless base station may also be adjusted based on the calculated confidence score.

FIG. 3 illustrates an example of an adjusted estimated location of wireless base station 110. An estimated location 210 of wireless base station 110 has been calculated based on a set of points 212-218. Using accuracy analysis as described above, the following weights may be determined for the collected points 212-216 based on the respective weights used: point 216 has the highest weight, point 218 has the second highest, point 212 has a lower weight, and point 214 has the lowest weight. The estimated location of wireless base station 110 is then adjusted to a new location 310 based on a confidence score calculated from these weights associated with points 212-216. An estimated coverage region may also be adjusted to region 300 accordingly from an original estimated region 200. In this way, accuracy analysis as described herein may be used to provide more accurate estimations of the locations of wireless base stations. The estimated locations of wireless base stations may in turn be used to more accurately estimate locations of general mobile devices for users.

In one embodiment, the estimated location, the estimated coverage region, the accuracy analysis results such as the confidence score, and/or the adjusted location and the adjusted coverage region can be stored on a storage device. The storage device may include a memory, a hard disk, a removable storage drive, or other possible storage media. In some embodiments, step 460 is optional depending on specific applications.

Figure 6:
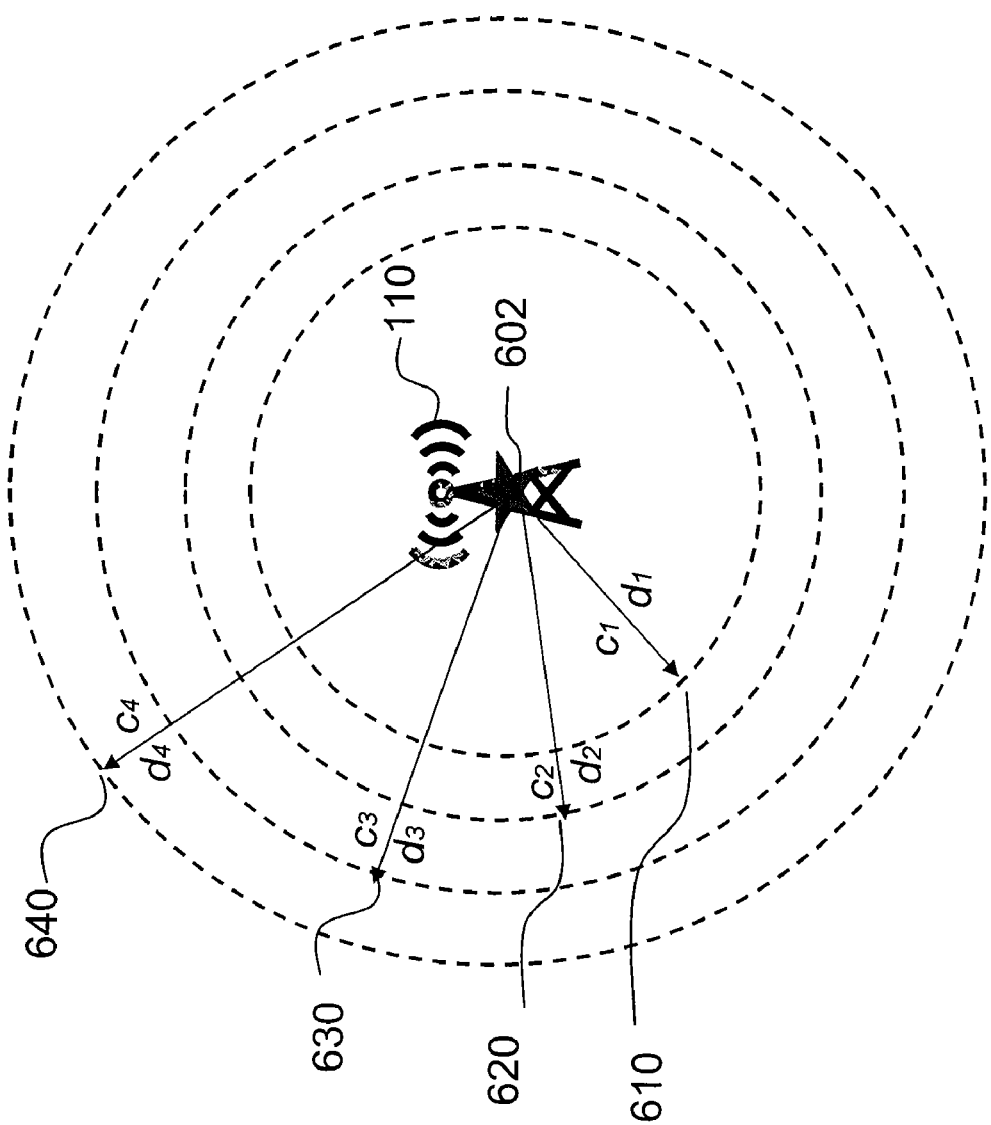
FIG. 6 illustrates an exemplary confidence and positioning diagram according to one embodiment of the invention.

In another embodiment as described in U.S. provisional application No. 61/196,167, filed on Oct. 15, 2008 (incorporated in its entirety herein by reference), multiple circles may be provided for the estimated location and coverage region for a wireless base station as shown in FIG. 6. In this example, wireless base station 110 has an estimated location 602. Estimated location 602 is the center of multiple concentric circles 610, 620, 630, and 640. Each circle may be associated with a confidence score obtained based on an accuracy result in the analysis above (see e.g. step 550 in FIG. 5). For instance, the innermost circle 610 may indicate that there is a $c_1$ (e.g. 50%) likelihood that wireless base station 110 is within $d_1$ distance (e.g. 10 meters) of the epicenter of circle 610. The next smallest circle 620 may be used to indicate that there is a $c_2$ (e.g. 67%) likelihood of wireless base station 110 being within $d_2$ distance (e.g. 25 meters) of the epicenter of circle 620. The next circle 630 may be used to indicate that there is a $c_3$ (e.g. 75%) likelihood of wireless base station 110 being within $d_3$ distance (e.g. 50 meters) of the epicenter of circle 630. And the outermost circle 640 may be used to indicate that there is a $c_4$ (e.g. 90%) chance of the wireless base station 110 being within $d_4$ distance (e.g. 125 meters) of the epicenter of circle 640. In one example, an $O(n^2)$ algorithm may be used to detect outliers in the collected points, where n is the number of collected points. This may be done as follows. First, the centroid of the points may be computed. Then for each point, its distance to the centroid may be computed. If the distance for a given point exceeds a threshold, then the point may be marked or otherwise identified as an outlier. The process may be refined by removing some/all of the outliers and repeating the above steps. This may be repeated until there are no more outliers or the algorithm converges. In this way, multiple circles or coverage regions are identified and associated with different confidence scores based on the accuracy analysis.

Computer Systems

Figure 7:
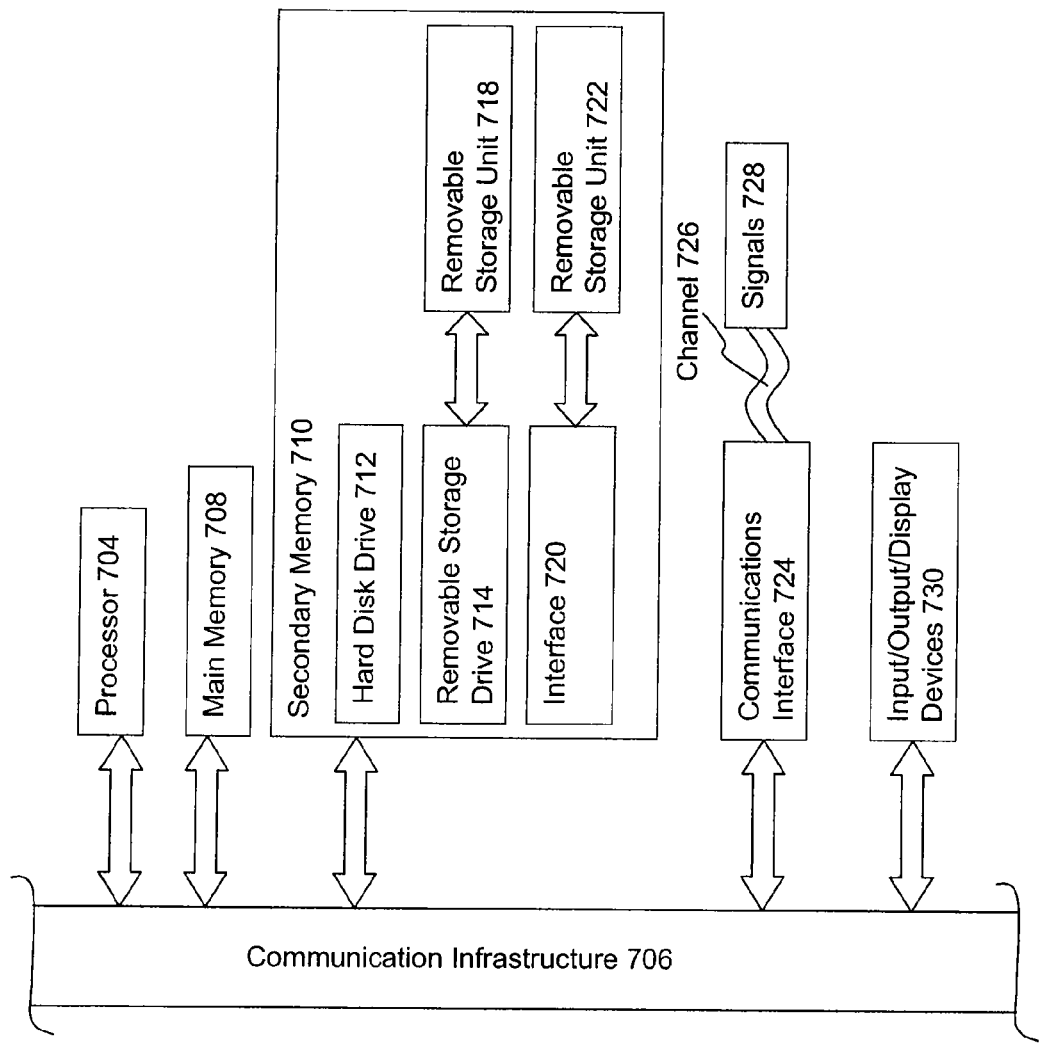
FIG. 7 is an architecture diagram of a computer system for the accuracy analysis of wireless base station locations according to one embodiment of the invention.

The present invention may be implemented using hardware, software or a combination thereof and may be implemented in a computer system or other processing device. The hardware, software or the combination can embody any of the modules in FIGS. 1A and 1B and/or any stage in FIGS. 4A and 4B and FIG. 5. In an embodiment, the invention is directed toward a computer program product executing on a computer system capable of carrying out the functionality described herein. This applies to any of the components in system 100. An example of a computer system 700 is shown in FIG. 7. Computer system 700 includes one or more processors, such as processor 704. Processor 704 is connected to a communication bus 706. Various software embodiments are described in terms of this example computer system. After reading this description, it will become apparent to a person skilled in the relevant art how to implement the invention using other computer systems and/or computer architectures.

Computer system 700 also includes a main memory 708, preferably random access memory (RAM), and may also include a secondary memory 710. Secondary memory 710 may include, for example, a hard disk drive 712 and/or a removable storage drive 714, representing a floppy disk drive, a magnetic tape drive, an optical disk drive, etc. Removable storage drive 714 reads from and/or writes to a removable storage unit 718 in a well-known manner. Removable storage unit 718, represents magnetic tape, optical disk, memory card, etc. which is read by and written to by removable storage drive 714. As will be appreciated, removable storage unit 718 includes a computer usable storage medium having stored therein computer software and/or data.

In alternative embodiments, secondary memory 710 may include other similar means for allowing computer programs or other instructions to be loaded into computer system 700. Such means may include, for example, a removable storage unit 722 and an interface 720. Examples of such may include a removable memory chip (such as an EPROM, or PROM) and associated socket, and other removable storage units 722 and interfaces 720 which allow software and data to be transferred from removable storage unit 722 to computer system 700.

Computer system 700 may also include a communication interface 724. Communication interface 724 enables computer system 700 to communicate with external and/or remote devices. For example, communication interface 724 allows software and data to be transferred between computer system 700 and external devices. Communication interface 724 also allows computer system 700 to communicate over communication networks, such as LANs, WANs, the Internet, etc. Communication interface 724 may interface with remote sites or networks via wired or wireless connections. Examples of communications interface 724 may include a modem, a network interface (such as an Ethernet card), a communications port, a PCMCIA slot and card, etc. Computer system 700 receives data and/or computer program products via communication network 724. Software and data transferred via communications interface 724 are in the form of signals 728 which may be electronic, electromagnetic, optical or other signals capable of being received by communications interface 724. Signals 728 are provided to communications interface 724 via a communications path (i.e., channel) 726. This channel 726 carries signals 728 and may be implemented using wire or cable, fiber optics, a phone line, a cellular phone link, an RF link and other wired or wireless communications channels.

In this document, the terms "computer program medium" and "computer usable medium" are used to generally refer to media such as removable storage drive 714, and a hard disk installed in hard disk drive 712. These computer program products are means for providing software to computer system 700.

Computer programs (also called computer control logic) are stored in main memory 708 and/or secondary memory 710. Computer programs may also be received via signal 728 and communications interface 724. Such computer programs, when executed, enable computer system 700 to perform the features of the present invention as discussed herein. In particular, the computer programs, when executed, enable processor 704 to perform the features of the present invention. Accordingly, such computer programs represent controllers of computer system 700.

In an embodiment where the invention is implemented using software, the software may be stored in a computer program product and loaded into computer system 700 using removable storage drive 714, hard disk drive 712 or communications interface 724. The control logic (software), when executed by processor 704, causes processor 704 to perform the functions of the invention as described herein.

Computer system 700 also includes input/output/display devices 732, such as monitors, keyboards, pointing devices, etc.

The invention can work with software, hardware, and operating system implementations other than those described herein. Any software, hardware, and operating system implementations suitable for performing the functions described herein can be used.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for analyzing accuracy of an estimation of a wireless base station location comprising:
    collecting data from a set of mobile devices using the wireless base station;
    obtaining a location of each mobile device in the set of mobile devices;
    estimating, on a processing device, a location of the wireless base station according to the obtained locations of the set of mobile devices;
    determining a weight based on a platform diversity of types of mobile devices;
    determining a confidence score using a weight function according to the determined weight; and
    analyzing accuracy of the estimated location of the wireless base station based on the determined confidence score.

2. The method of claim 1, further comprising:
    adjusting the estimated location of the wireless base station according to the analyzed accuracy of the estimated location.

3. The method of claim 1, further comprising:
    estimating a coverage region of the wireless base station according to the obtained locations of the set of mobile devices; and
    analyzing accuracy of the estimated coverage region of the wireless base station according to the collected data.

4. The method of claim 3, further comprising:
    adjusting the estimated coverage region of the wireless base station according to the analyzed accuracy of the estimated coverage region.

5. The method of claim 1, wherein estimating a location of the wireless base station according to the obtained locations of the set of mobile devices comprises:
   calculating a centroid of the obtained locations of the set of mobile devices; and
   assigning the centroid as the estimated location of the wireless base station.

6. The method of claim 1, wherein determining a weight based on a platform diversity of types of mobile devices comprises:
   determining a weight based on the platform diversity of types of mobile devices and a size of the collected data.

7. The method of claim 1, wherein determining a platform diversity of types of mobile devices comprises:
   calculating a weight according to types of platforms of the mobile devices.

8. The method of claim 1, wherein determining a platform diversity of types of mobile devices comprises:
   calculating a weight according to a temporal diversity of the collected data.

9. The method of claim 1, wherein determining a platform diversity of types of mobile devices comprises:
   calculating a weight according to a spatial diversity of the collected data.

10. The method of claim 1, wherein determining a platform diversity of types of mobile devices comprises:
    calculating a weight according to a quality of the collected data.

11. The method of claim 1, further comprising storing the analyzed accuracy of the estimated location on a storage device.

12. A system of accuracy analysis of wireless base station location comprises:
    an accuracy analyzer configured to analyze the accuracy of an estimated location of a wireless base station, wherein the accuracy analyzer further comprises:
    a mobile device data collection module configured to collect data from a set of mobile devices using the wireless base station;
    a wireless base station location estimation module configured to estimate a location of the wireless base station according to the data collected by the mobile device data collection module; and
    an accuracy-analyzing module configured to:
       determine, by a weight calculating unit, a weight based on a platform diversity of types of mobile devices,
       determine a confidence score using a weight function according to the determined weight, and
       analyze accuracy of the estimated location of the wireless base station based on the determined confidence score.

13. The system of claim 12, wherein the mobile device data collection module comprises:
    a mobile device location estimation module configured to estimate a location of a mobile device.

14. The system of claim 12, wherein the wireless base station location estimation module is further configured to estimate a coverage region of the wireless base station according to the data collected by the mobile device data collection module.

15. The system of claim 12, wherein the accuracy-analyzing module comprises:
    a location-adjusting unit configured to adjust the estimated location of the wireless base station according to the confidence score calculated by the confidence scoring unit.

16. The system of claim 15, wherein the location-adjusting unit is further configured to adjust an estimated coverage region of the wireless base station according to the confidence score calculated by the confidence scoring unit.

17. The system of claim 12, wherein the weight calculation unit is further configured to calculate a weight according to the size of the data collected by the mobile device data collection module for the wireless base station.

18. The system of claim 12, wherein the weight calculation unit is further configured to calculate a weight according to platform types of the mobile devices corresponding to the data collected by the mobile device data collection module for the wireless base station.

19. The system of claim 12, wherein the weight calculation unit is further configured to calculate a weight based on a temporal diversity of the data collected by the mobile device data collection module for the wireless base station.

20. The system of claim 12, wherein the weight calculation unit is further configured to calculate a weight based on a spatial diversity of the data collected by the mobile device data collection module for the wireless base station.

21. The system of claim 12, wherein the weight calculation unit is further configured to calculate a weight based on a quality of the data collected by the mobile device data collection module for the wireless base station.

22. The system of claim 12, wherein the accuracy analyzer is further configured to obtain a location of a mobile device.

* * * * *